US010157037B2

United States Patent
Patel et al.

(10) Patent No.: US 10,157,037 B2
(45) Date of Patent: Dec. 18, 2018

(54) PERFORMING AN OPERATION AT A HEADPHONE SYSTEM

(71) Applicant: BOSE CORPORATION, Framingham, MA (US)

(72) Inventors: Hiren Harshad Patel, Chelmsford, MA (US); Kemal Kulovic, Arlington, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/088,020

(22) Filed: Mar. 31, 2016

(65) Prior Publication Data

US 2017/0289671 A1    Oct. 5, 2017

(51) Int. Cl.
| | | |
|---|---|---|
| H04R 1/00 | (2006.01) | |
| G06F 3/16 | (2006.01) | |
| H04R 1/10 | (2006.01) | |
| H04R 5/033 | (2006.01) | |
| H04R 5/04 | (2006.01) | |

(52) U.S. Cl.
CPC .......... G06F 3/165 (2013.01); H04R 1/1041 (2013.01); H04R 5/033 (2013.01); H04R 5/04 (2013.01); H04R 2430/01 (2013.01); H04R 2460/01 (2013.01); H04R 2460/03 (2013.01)

(58) Field of Classification Search
CPC ........ H04R 5/033; H04R 5/04; H04R 1/1041; H04R 2460/01; H04R 2460/03
USPC .............................. 381/370–371, 376, 58, 74
See application file for complete search history.

(56) References Cited

U.S. PATENT DOCUMENTS

| | | | | |
|---|---|---|---|---|
| 8,130,990 | B2 * | 3/2012 | Reithinger | H04R 25/552 381/11 |
| 8,238,567 | B2 | 8/2012 | Burge et al. | |
| 8,971,559 | B2 | 3/2015 | Sacha et al. | |
| 9,344,792 | B2 * | 5/2016 | Rundle | H04R 1/1083 |
| 9,479,858 | B2 * | 10/2016 | Kulavik | H04R 1/1041 |
| 2004/0125972 | A1 | 7/2004 | Boor et al. | |
| 2009/0052702 | A1 * | 2/2009 | Murphy | H04R 1/1016 381/309 |
| 2009/0052707 | A1 * | 2/2009 | Hain | H04R 25/43 381/315 |
| 2010/0166207 | A1 * | 7/2010 | Masuyama | H04R 1/1041 381/74 |

(Continued)

OTHER PUBLICATIONS

Extended European Search Report for application No. 17159303.1-1905, dated Jun. 27, 2017.

(Continued)

*Primary Examiner* — Disler Paul
(74) *Attorney, Agent, or Firm* — Patterson + Sheridan, LLP

(57) ABSTRACT

An on/off head detection system uses magnetic field intensity to determine a configuration, position, and/or orientation of a headphone. In some implementations, the system may determine whether a headphone is on or off a user's head. The system includes a magnetic field sensor configured to detect a magnetic field emitted by a magnetic field source associated with an earpiece of the headphone. A control module determines an intensity of the magnetic field and whether the intensity of the magnetic field satisfies a threshold. An operational mode associated with the headphone or an associated device is performed in response to the intensity of the magnetic field satisfying the threshold.

22 Claims, 4 Drawing Sheets

(56) References Cited

U.S. PATENT DOCUMENTS

| | | | |
|---|---|---|---|
| 2010/0166208 A1* | 7/2010 | Kato | H04R 1/1033 |
| | | | 381/74 |
| 2011/0117973 A1 | 5/2011 | Asrani et al. | |
| 2012/0114132 A1* | 5/2012 | Abrahamsson | H04R 1/1016 |
| | | | 381/74 |
| 2012/0281850 A1 | 11/2012 | Hyatt | |
| 2013/0343585 A1* | 12/2013 | Bennett | H04R 25/554 |
| | | | 381/315 |
| 2014/0086438 A1* | 3/2014 | Tachibana | H04R 29/001 |
| | | | 381/309 |
| 2014/0321682 A1 | 10/2014 | Kofod-Hansen et al. | |
| 2015/0010175 A1* | 1/2015 | Porter | H04R 3/00 |
| | | | 381/164 |
| 2016/0021470 A1* | 1/2016 | Gustafsson | H04R 25/558 |
| | | | 381/315 |
| 2016/0057530 A1* | 2/2016 | Anderson | H04R 1/1041 |
| | | | 381/384 |
| 2017/0034648 A1* | 2/2017 | Hutchings | H04S 7/30 |

OTHER PUBLICATIONS

EP Office Action for application No. 17 159 303.1-1207, dated Jun. 23, 2018, 4 pp.

* cited by examiner

PERFORMING AN OPERATION AT A HEADPHONE SYSTEM

I. FIELD OF THE DISCLOSURE

The present disclosure relates in general to a headphone system, such as around or on-ear headphones or in-ear earbuds, and more particularly, to performing an operation at a headphone system (e.g., a headphone device or a device in communication with the headphone device).

II. BACKGROUND

Headphones are often worn to privately listen to audio sound of an audio source, a video source, or a combination. The user may remove and replace the headphones on his or her head. Automatically detecting an unworn headphone, removal or replacement of a headphone on the user's head can be used to control playback of audio and/or to conserve power in the headphones.

III. SUMMARY

All examples and features mentioned below can be combined in any technically possible way.

In one aspect, a method includes receiving, in a first earpiece, a magnetic field emitted by a magnetic field source associated with a second earpiece of a headphone and determining an intensity of the magnetic field. The method further includes determining whether the intensity of the magnetic field satisfies a threshold. In response to the intensity of the magnetic field satisfying the threshold, the method includes initiating an operation at the headphone or a device in communication with the headphone is performed.

Embodiments may include one of the following features, or any combination thereof. The operation may include a power-on operation, a power-off operation, disabling active noise reduction (ANR), enabling ANR, pausing audio, playing audio, playing video, and pausing playback of video. Performing the operation may include altering an indication of a notification message on the headphone. Performing the operation may include processing audio played by the headphone for one or more playback modes by changing at least one of a volume or equalization applied to the audio played by the headphone. The method may include initiating a second operation at the headphone or the device in response to a determination that the intensity of the magnetic field has reached a second threshold.

The magnetic field source may include one or more of a magnet included in an acoustic transducer of the headphone or a magnet distinct from the acoustic transducer. The magnetic field source may include a device, such as a near field communication (NFC) tag device. The intensity of the magnetic field may be determined by measuring the magnetic field along three axes. A time may be measured for the headphone to change from a first headphone orientation to a second headphone orientation.

In another aspect, an apparatus includes a magnetic field sensor configured to detect a magnetic field emitted by an earpiece of a headphone. A control module is configured to determine an intensity of the magnetic field and to determine whether the intensity of the magnetic field has reached a threshold. In response to the intensity of the magnetic field reaching the threshold, an operational mode associated with at least one of the headphone or a device in communication with the headphone is performed.

Embodiments may include one of the following features, or any combination thereof. The control module may be further configured to send a signal to the device that corresponds to the operational mode. The operational mode may include a power-on operation, a power-off operation, disabling an ANR operation, enabling the ANR operation, pausing an audio output operation, providing the audio output, providing a video output, and pausing playback of the video output of the headphone or the device. The operational mode associated with the headphone or the device may include altering an indication of a notification message on the headphone. The operational mode associated with the headphone or the device may include changing at least one of a volume and equalization applied to the audio played by the headphone.

The device may include at least one of a smartphone, a computer, a computer tablet, a first system capable of outputting video, a second system capable of outputting audio, a radio, a television, or a cellular phone. A second operational mode may be performed by the control module in response to a determination that the intensity of the magnetic field has reached a second threshold.

The magnetic field may emanate from one or more of a magnet associated with an acoustic transducer of the headphone or a magnet distinct from the acoustic transducer. The magnetic field may emanate from a near field communication (NFC) tag device. A magnetic field sensor may be configured to detect the magnetic field along three axes. The magnetic field sensor may be configured to detect the magnetic field at a periodic interval, and the periodic interval may depend on an operating state of the headphone.

In another aspect, a headphone includes a first acoustic transducer, a second acoustic transducer, and a magnetic field sensor configured to receive a magnetic field emitted by at least one magnet associated with the first acoustic transducer or the second acoustic transducer. A control module is configured to determine an intensity of the magnetic field and to determine whether the intensity of the magnetic field has reached a threshold. In response to the intensity of the magnetic field reaching the threshold, an operational mode associated with at least one of the headphone or a device in communication with the headphone is performed.

Embodiments may include one of the following features, or any combination thereof. The device may include at least one of a smartphone, a computer, a computer tablet, a first system capable of outputting video, a second system capable of outputting audio, a radio, a television, or a cell phone. The headphone may include a secondary magnet distinct from the magnet associated with the first acoustic transducer or the second acoustic transducer. The magnetic field sensor may be configured to detect the magnetic field along three axes.

The control module may be further configured to determine a time for the headphone to change from a first headphone orientation to a second headphone orientation. The control module may be further configured to determine optimum threshold values associated with determining a headphone's position or orientation. The threshold or a plurality of thresholds may be based on the optimum threshold values. The control module may be further configured to perform a second operational mode associated with the at least one of the headphone or the device in response to a determination that the intensity of the magnetic field has reached a second threshold. The control module may be further configured to determine whether the intensity of the magnetic field has reached a third threshold, and in response to the intensity of the magnetic field reaching the third threshold, to perform a third operational mode associated with the headphone or the device.

IV. BRIEF DESCRIPTION OF THE DRAWINGS

V. DETAILED DESCRIPTION

Figure 1:
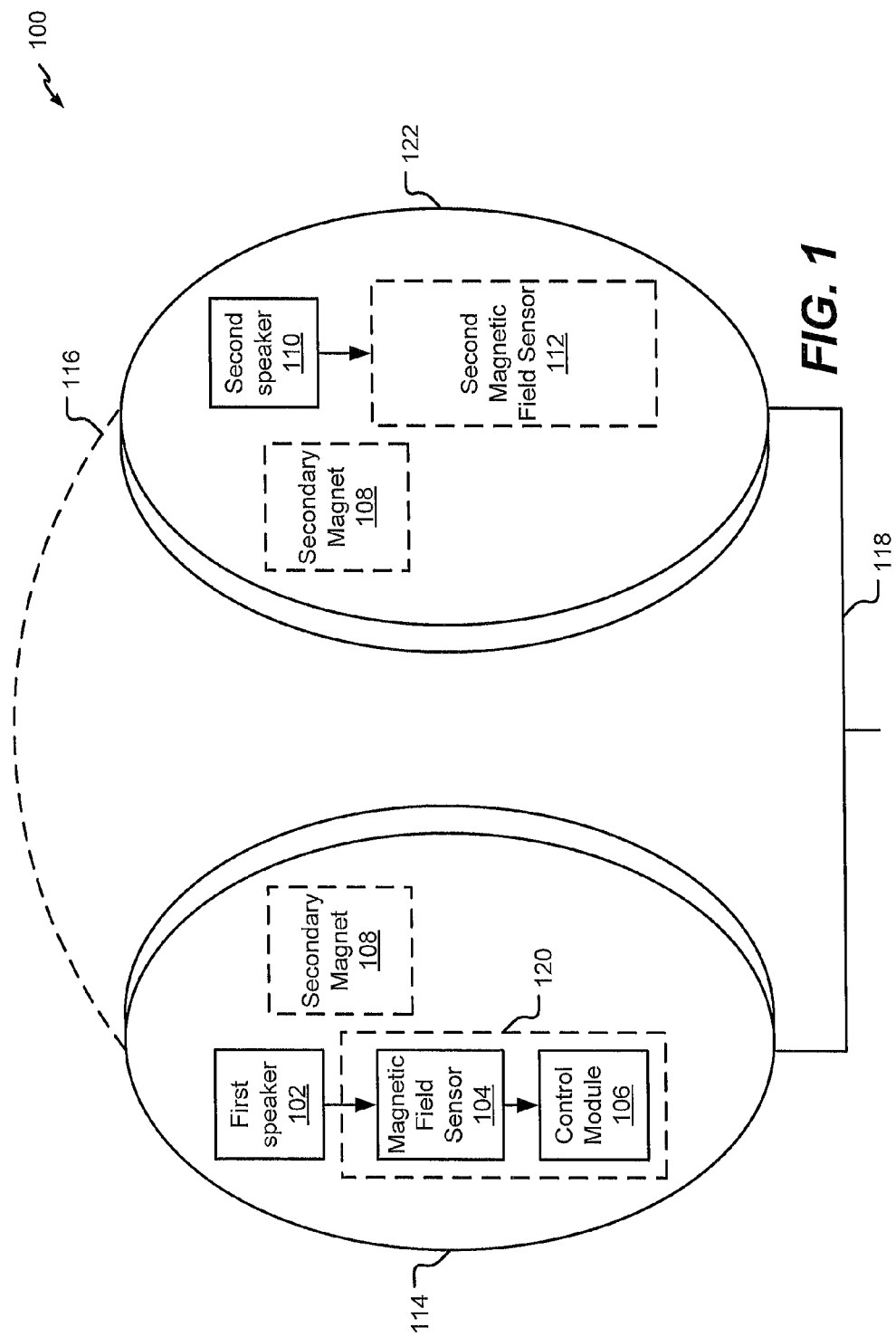
FIG. 1 is a schematic of an illustrative implementation of a headphone with an on/off head detection system using magnetic field sensing.

A headphone refers to a device that fits around, on, or in an ear and that radiates acoustic energy into the ear canal. Headphones are sometimes referred to as earphones, earpieces, earbuds, earcups, or sport headphones, and can be wired or wireless. A headphone includes an acoustic driver to transduce audio signals to acoustic energy. The acoustic driver may be housed in an earcup or earbud. A headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a communication device.

An on/off head detection system that uses magnetic field sensing to detect when a headphone has been placed on or off a wearer's head is described herein. In one implementation, each headphone emits magnetic fields created by one or more magnetic field sources in the headphone. The magnetic field sources may be a magnet and/or coil associated with one or more acoustic transducers of the headphone, a separate magnet housed in the casing of the headphone, or a coil excited with electrical current, or a combination thereof. In operation, as the distance between earpieces of the headphones varies, the intensity of emitted magnetic fields varies as well. The intensity of emitted magnetic fields may vary depending on whether the magnetic field sources constructively or destructively interfere with each other, as described herein.

For example, when both earpieces are positioned in the vicinity of each other, the magnetic field sources may constructively or destructively interfere with each other. In the example where they destructively interfere with each other and the earpieces are positioned directly next to each other, the intensity of the emitted magnetic field (measured at one of the earpieces) is generally at its lowest level. The intensity of the magnetic field increases as the distance between the two earpieces increases. The intensity of the emitted magnetic field can be monitored by a magnetic field sensor and/or control module that can determine, based on the intensity, whether the headphones are on or off a wearer's head, and in some instances, the particular position of the headphones. For example (using the scenario where the magnets destructively interfere with each other), when the earpieces are closer together (as they might be when off a wearer's head), the intensity of the magnetic field decreases, which may be used to infer a user is not wearing the headphones. By contrast, when the earpieces are farther apart (as they might be when on a wearer's head), the intensity of the magnetic field increases, which may be used to infer a user is wearing the headphones. Additionally, changes in the intensity of the magnetic fields may be monitored. For example, as earpieces are pulled farther apart (as they might be during donning or doffing events), the intensity of the magnetic field increases, which may be used to infer a user is putting on or taking off the headphones. When the headphones are off a wearer's head, the intensity of the magnetic field may be different in various situations. For example, the emitted magnetic field may have a different intensity when the headphones are worn around a user's neck, worn on a user's head but not on, in or around the user's ears, placed on a surface or an object, placed within a carrying case, or suspended on a person or object. The on/off head detection system described herein can be used to determine a position and/or orientation of the headphones based on the varying intensity of the magnetic fields emitted in each of these situations.

In one implementation, one or more magnetic field sensors are configured to receive magnetic fields emitted by one or more magnetic field sources within the earpiece(s). The magnetic field sources may be a magnet and/or coil associated with at least one acoustic transducer of the headphones, a separate magnet housed in the casing of the headphone, or a coil excited with electrical current, or a combination thereof. The magnetic fields detected by the sensor may be generally constant (e.g., magnetic fields emitted by a permanent magnet) or may be varying (e.g., magnetic fields emitted by near field communication (NFC) devices). A control module is configured to determine the intensity of the magnetic fields and whether the intensity of the magnetic fields has reached one of a set of thresholds, which may be associated with various positions and/or orientations of the headphones. In response to the intensity of the magnetic fields reaching a threshold, the control module is configured to perform one or more operational modes associated with the headphones and/or a secondary device in communication with the headphones. For example, the control module may be configured to power on the headphones when a first threshold is reached that indicates the user has placed the headphones on his or her head. The control module may be further configured to power off the headphones when a second threshold is reached that indicates the user has placed the headphones on a surface. Any number of thresholds may be used to represent various on and off states for the headphones.

In an example where the magnetic field sources destructively interfere with each other, the magnetic field detected by the sensor may be at its lowest level when the earpieces and associated magnetic field sources are closest together. In this example, when the earpieces and associated magnetic field sources are farthest apart, the magnetic field detected by the sensor is at its highest level. By contrast, in an implementation where the magnetic field sources constructively interfere with each other, the magnetic field becomes stronger as the earpieces move closer together, and becomes weaker as the earpieces are moved apart. Thus, in an implementation where the magnetic field sources constructively interfere with each other, the magnetic field detected by the sensor may be at its highest level when the earpieces and associated magnetic field sources are closest together, while the magnetic field detected by the sensor may be at its lowest level when the earpieces and associated magnetic field sources are farthest apart. Either scenario may be detected as the system disclosed herein determines a change in the magnetic field (whether an increase or decrease). One skilled in the art will appreciate that whether the magnetic field sources constructively or destructively interfere depends on a number of factors, including the types of magnetic field sources and their orientation.

The magnetic sensing described herein may be operated in a manner to conserve battery power of the headphones while improving accuracy. For example, battery power is conserved by using the magnetic sensing to confirm that the headphones are not in use by sensing a change in position of one or both of the earpieces. When the control module determines that the headphones are not in use, various functions associated with the headphones may be disabled, deactivated or otherwise shut down. In addition, an implementation of the magnetic sensing described herein uses components already present in the headphone, or adds components in ways that do not require wires to be routed between the two headphones. For example, the magnetic field sources may be magnets that are part of the acoustic transducers already present in the headphones. In addition, the magnetic field sensor may be added to the earpiece where the control module resides to avoid routing power or data between the earpieces. Similarly, an additional magnetic field source, where desired, may be added to the secondary earpiece (i.e., the earpiece that does not include the control module), to supplement the magnetic field in that earpiece without requiring additional wiring between the earpieces.

FIG. 1 depicts a headphone system 100 having earpieces 114, 122 and an optional headphone cable 118 (which may be omitted in a wireless configuration). In some examples, a headphone band 116 is included. The earpiece 114 includes a first acoustic transducer 102 (which may also be referred to as a driver or speaker), a magnetic field sensor 104, and a control module 106. In some examples, a secondary magnet 108 is included to increase intensity of the magnetic fields emitted by the first speaker 102. As shown in FIG. 1, the magnetic field sensor 104 and the control module 106 may be integrated into a single device 120, such as a microprocessor, microcontroller, or other integrated circuit.

A second earpiece 122 includes a second acoustic transducer 110 (which may also be referred to as a driver or speaker). In some examples, a secondary magnet 108 is included to increase intensity of the magnetic fields emitted by the second speaker 110. The second earpiece 122 may also include a second magnetic field sensor 112.

In FIG. 1, the magnetic field sensor 104 receives magnetic fields emitted by at least one magnet associated with the first speaker 102 of the headphone system 100. As one of skill in the art appreciates, an acoustic transducer may include one or more magnets and/or coils that form a motor structure for generating sound. These magnets and/or coils emit a magnetic field that can be detected by magnetic field sensor 104. Similarly, the magnetic fields emitted by a magnet associated with the second speaker 110 of the headphone system 100 are also received by the magnetic field sensor 104.

As shown, a secondary magnet 108 is optionally used to augment or supplement the magnetic fields emitted by the first speaker 102, the second speaker 110, or a combination thereof. The secondary magnet 108 may be placed in the first earpiece 114, the second earpiece 122, or both. Alternatively, the secondary magnet may be placed along the headphone band 116, over the first earpiece 114, over the second earpiece 122, or over both earpieces 114, 122. The secondary magnet 108 may be added when the magnets within the acoustic drivers are not strong enough on their own to detect a meaningful difference in the position of the headphone earpieces. Adding the secondary magnet 108 increases the signal-to-noise ratio so that a stronger difference may be measured when the earpieces change position. The secondary magnet 108 also helps reduce sensitivity to fit-to-fit variation on users who have different head shapes, sizes, etc. The secondary magnet 108 may be selected so that the set of magnets constructively or destructively interfere in a desired manner along one or more axes.

The control module 106 (or the magnetic field sensor 104) may determine the intensity of the magnetic fields emitted by the magnets associated with the first speaker 102, the second speaker 110 and/or secondary magnets 108 to determine the location or position of the earpieces 114, 122. The intensity of the magnetic fields may correspond to a magnetic field strength or a magnetic flux density. The control module 106 may determine whether the intensity of the magnetic fields has reached one or more thresholds associated with one or more configurations, positions or orientations of the earpieces 114, 122.

For example, a first threshold may be associated with an intensity of the magnetic fields emitted by the headphone system 100 when the headphone system 100 is on a surface with the first and second earpieces positioned directly next to each other. A second threshold may be associated with an intensity of the magnetic fields emitted by the headphone system 100 when the headphone system 100 is being worn by a user and the earpieces 144, 122 are in, around or over a user's ears. A third threshold may be associated with an intensity of the magnetic fields emitted by the headphone system 100 when the headphone system 100 is being worn by user on or around a user's neck. Additional thresholds may correspond to an intensity of the magnetic fields emitted by the headphone system 100 when the headphone system is in various other configurations (i.e., worn on the head but not in, around or over a user's ears, placed in a carrying case for transportation, placed on a leg, shoulder or other portion of a user's body, only one earpiece is on, in around or over a user's ear, the earpieces are at an angle with respect to each other, etc.). Accordingly, each intensity of the magnetic fields generated by various positions, orientations, distances, or any combination thereof, of the first earpiece 114 relative to the second earpiece 122 corresponds to a particular threshold of a plurality of thresholds.

The one or more thresholds may be set by characterizing the emitted magnetic field in one or more axes with the headphones in various positions (on the ears, parked on the head, around the neck, on a surface, in a carrying case, on a leg, shoulder or other portion of a user's body, etc.) The thresholds may be pre-set, but may also be determined on-the-fly via calibration measurements done by the user. Thresholds may be set for all three axes of the magnetic field. The system may detect a change in at least one of the axes when there has been a change in position of one or both of the earpieces.

The plurality of thresholds may be predetermined or determined automatically on-the-fly. In one example, each of the plurality of thresholds is determined based on a manufacturer evaluation, a user calibration, a vendor evaluation, or any combination thereof. The thresholds are stored in a memory in communication with the control module 106. In another implementation, a user calibrates the headphone system 100 by associating each of a plurality of thresholds determined based on various positions, orientations, distances, or any combination thereof, of the first earpiece 114 relative to the second earpiece 122. The user stores the plurality of thresholds in a memory in communication with the control module 106. The plurality of thresholds of an example are determined from a particular intensity of the magnetic fields emitted from a particular position, orientation, distance, or any combination thereof, of the first earpiece 114 relative to the second earpiece 122.

In some examples, the control module 106 determines whether the intensity of the magnetic fields has reached one or more of the thresholds in response to a trigger. The trigger may be associated with a change in position, orientation, distance, or any combination thereof, of the first earpiece 114 relative to the second earpiece 122. The trigger may be produced by another sensing mechanism that detects the configuration and orientation of the headphones. For example, the headphone system 100 may include one or more other types of sensors (accelerometer, motion sensor, capacitive sensor, resistive sensor, IR sensor, acoustic sensor, microphones, etc.) that could also monitor the state of the headphones to determine if it they are on or off a user's head. One method that could be used in addition to magnetic sensing to determine the on or off head state of the headphone is described in U.S. Pat. No. 8,238,567, the entire content of which is incorporated herein by reference. Using multiple sensing systems may reduce the likelihood of false positives, as when both the magnetic sensor and the other sensor detect a change in position, it would increase the likelihood that the headphone has actually been moved. The multiple sensors may be operated in a way that could conserve battery power while improving accuracy. For example, if the magnetic sensor is more accurate but consumes more battery power compared to an alternate sensing method, the control module may be configured to only enable the magnetic sensing once the alternate sensing method had detected a change in position (or vice versa). That way, battery power is conserved and the more accurate sensing method is used to confirm there has been a change in position. In another implementation, the trigger is associated with a length of time a user took to change a first position, orientation, distance, or any combination thereof, of the first earpiece 114 relative to the second earpiece 122 to a second position, orientation, distance, or any combination thereof, of the first earpiece 114 relative to the second earpiece 122.

The magnetic field sensor 104 may detect emitted magnetic fields (and thus changes in the emitted magnetic fields) in all three axes, although another implementation may use a sensor that detects the magnetic fields in fewer than three axes. In some situations, the magnetic fields may constructively interfere on some axes while they destructively interfere on other axes. Thus, the properties and behavior of the magnets may be characterized so that the control module is programmed to determine, based on readings from all three axes, whether there has been a change in position of the headphones. A three-axis sensor may help eliminate false positives, as a change in the magnetic field in multiple axes may provide a more reliable indication that the earpieces 114, 122 have changed position. The magnetic field sensor 104 may also detect the orientation of the earpieces 114, 122 (i.e., whether they are rotated or in a neutral position) in addition to whether the earpieces 114, 122 are on or off of the user's head. For example, various thresholds may be associated with various orientations of the earpieces 114, 122.

The control module 106 performs at least one operational mode associated with at least one of the headphone system 100 or a device in communication with the headphone system 100 in response to the intensity of the magnetic fields reaching a threshold. An operational mode may include powering-on, powering-off, disabling ANR functionality, enabling ANR functionality, pausing audio and/or playback of video, resuming audio and/or playback of video, and controlling other functionality of the headphone system 100 or of a device in communication with the headphone system 100. In some examples, the operational mode may involve altering the playback of audio from the acoustic drivers in the earpieces based on the detected position of the headphone system 100. For example, if the control module 106 determines the earpiece is on a user's head and in, on or around a user's ears, the control module 106 may optimize audio playback for a private listening mode, with a private listening mode equalization, volume, etc. By contrast, if the control module 106 determines the earpiece is off a user's head, the control module may optimize audio playback for a shared listening mode, with a shared listening mode equalization, volume, etc. that permits the earpiece to act as a speaker for playing audio to a larger environment. In other examples, the operational mode may involve providing different notifications to a user based on the detected position of the headphone. For example, if the control module determines the headphone is on a user's head and in, on or around a user's ear, the control module 106 may provide the user with a notification of an incoming phone call, message or other notification via an audible sound output by the earpieces of the headphones. By contrast, if the control module 106 determines the headphone is off a user's head, the control module 106 may provide the user with a notification of an incoming phone call, message or other notification via a tactile sensation such as a vibration or an audible sound output by the earpieces of the headphones, with the sound being optimized for shared listening mode so the sound is more likely to be heard by the user. The notification may be, for example, from a device in communication with the headphone system 100. Other examples of operational modes that may be performed by the system in response to detecting a change in position or orientation are described in U.S. Pat. No. 8,238,567 referenced herein.

The device in communication with the headphone system 100 may include a smartphone, a computer, a computer tablet, a system capable of outputting video, a system capable of outputting audio, a radio, a television, a cellular phone, or any combination thereof. In some examples, the control module 106 performs a first operational mode associated with the headphone system 100 or the device in response to a determination that the intensity of the magnetic fields has reached a first threshold, and a second operational mode associated with the headphone system 100 or the device in response to a determination that the intensity of the magnetic fields has reached a second threshold.

In some examples, the earpiece 122 includes a second magnetic field sensor 112 in the opposite earpiece from the first magnetic field sensor 104. The second magnetic field sensor 112 may be included for testing, evaluation, or redundancy of an on/off head detection system via magnetic field sensing. For example, the second magnetic field sensor 112 may be included for a more accurate measurement of the intensity of the magnetic fields emitted by the first earpiece 114 relative to the second earpiece 122.

The magnetic fields emitted by the one or more magnets in the headphone system 100 may be monitored constantly by the magnetic field sensor(s). Alternatively, the magnetic field sensor(s) may periodically sample the magnetic field strength so that battery power is conserved. The frequency of the measurements may vary depending on the state of the earpieces 114, 122. For example, when a user is listening to music, the magnetic field may be detected more frequently than when a user is talking on the phone (i.e., in a situation where the user would not be expected to remove earpieces 114, 122).

Figure 2:
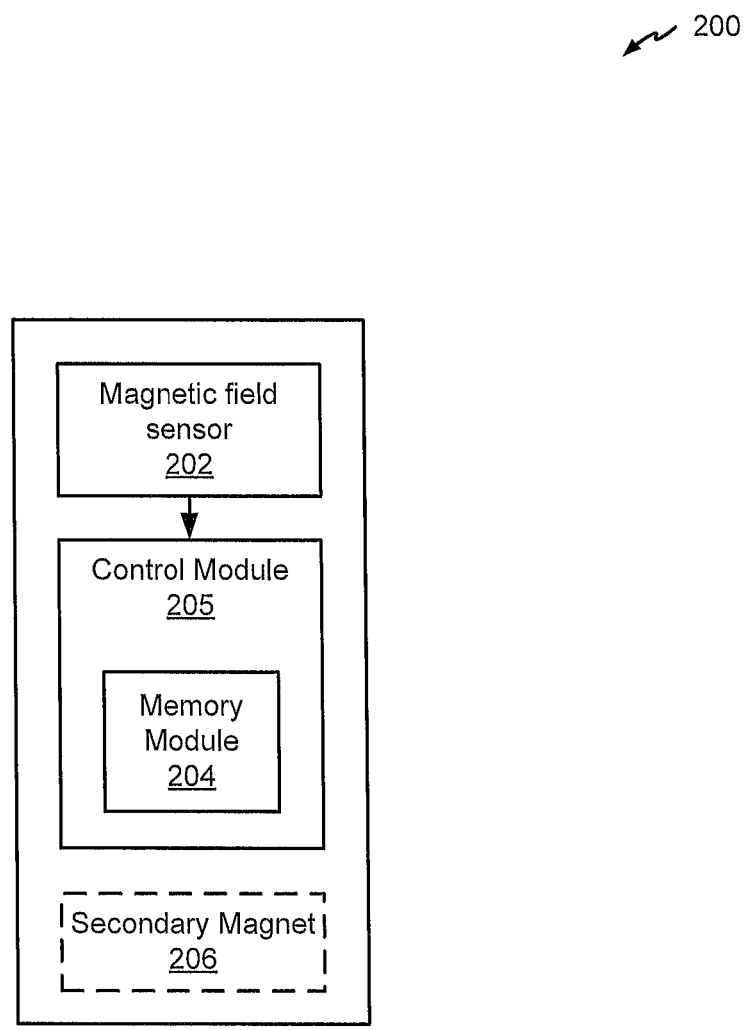
FIG. 2 is a schematic of an illustrative implementation of an on/off head detection system using magnetic field sensing.

FIG. 2 depicts a component device 200, which may be an integrated circuit, having a magnetic field sensor 202 and a control module 204. The magnetic field sensor 202 and control module 204 may be separate components or may be integrated into a single device. As explained herein, in some examples, the component device 200 may further include a secondary magnet 206. The component device 200 may correspond to the component device 120 of FIG. 1. The control module 204 includes a memory module 205, which may store a plurality of thresholds associated with one or more configurations, positions, or orientations of the headphone earpieces. The memory module 205 may be separate from or integrated with the control module 204. The magnets in each earpiece (whether part of the acoustic transducer or a separate magnet distinct from the acoustic transducer) may be, but do need not to be, identical in composition and orientation. Regardless of the magnets and their orientation (and whether they constructively or destructively interfere), the device 200 measures a change in magnetic field based on the relative position of each earpiece to each other.

Figure 3:
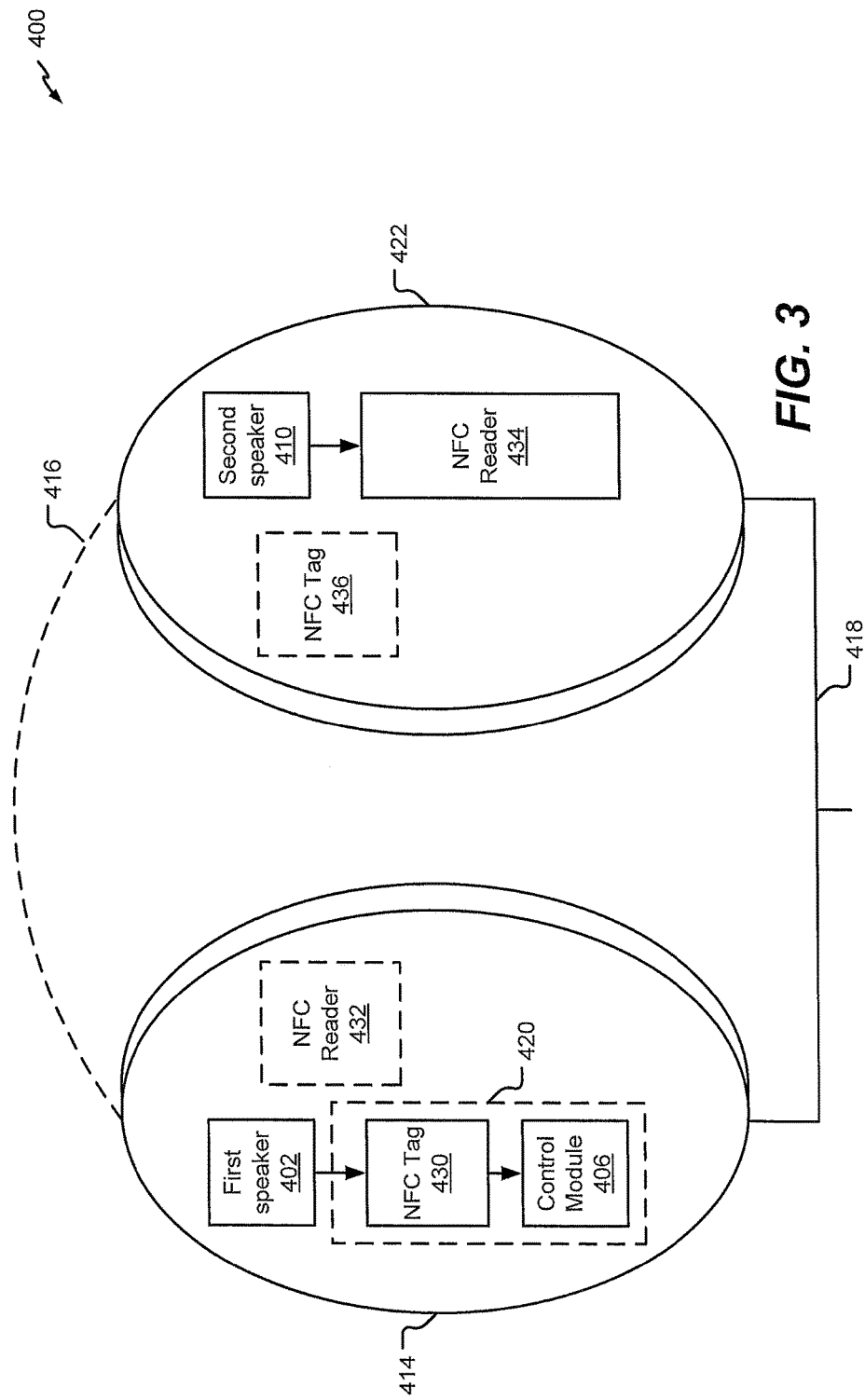
FIG. 3 is a schematic of an illustrative implementation of a headphone with an on/off head detection system using magnetic field sensing.

While FIGS. 1 and 2 depict a headphone system 100 that uses magnets as the magnetic field source for the on/off head detection system, other magnetic field sources could be used. For example, near field communication (NFC) devices may be used in a similar manner to detect when a headphone has been placed on or off a wearer's head. In this example, as shown in FIG. 3, a headphone system 400 has earpieces 414, 422 and an optional headphone cable 418 (which may be omitted in a wireless configuration). In some examples, a headphone band 416 is included. The earpiece 414 includes a first acoustic transducer 402, an NFC tag 430, and a control module 406. In some examples, earpiece 414 may also include an NFC reader 432. As shown in FIG. 3, the NFC tag 430 and the control module 406 may be integrated into a single device 420, such as a microprocessor, microcontroller, or other integrated circuit. A second earpiece 422 includes a second acoustic transducer 410 and an NFC reader 434. In some examples, the second earpiece 422 may also include an NFC tag 436. In operation, the NFC tag in one of the earpieces emits a magnetic field that can be detected by the corresponding NFC reader in the other earpiece. As the earpieces are moved closer together or farther apart, the intensity of the magnetic field changes, and can be detected by the NFC reader in a manner similar to that described above.

Figure 4:
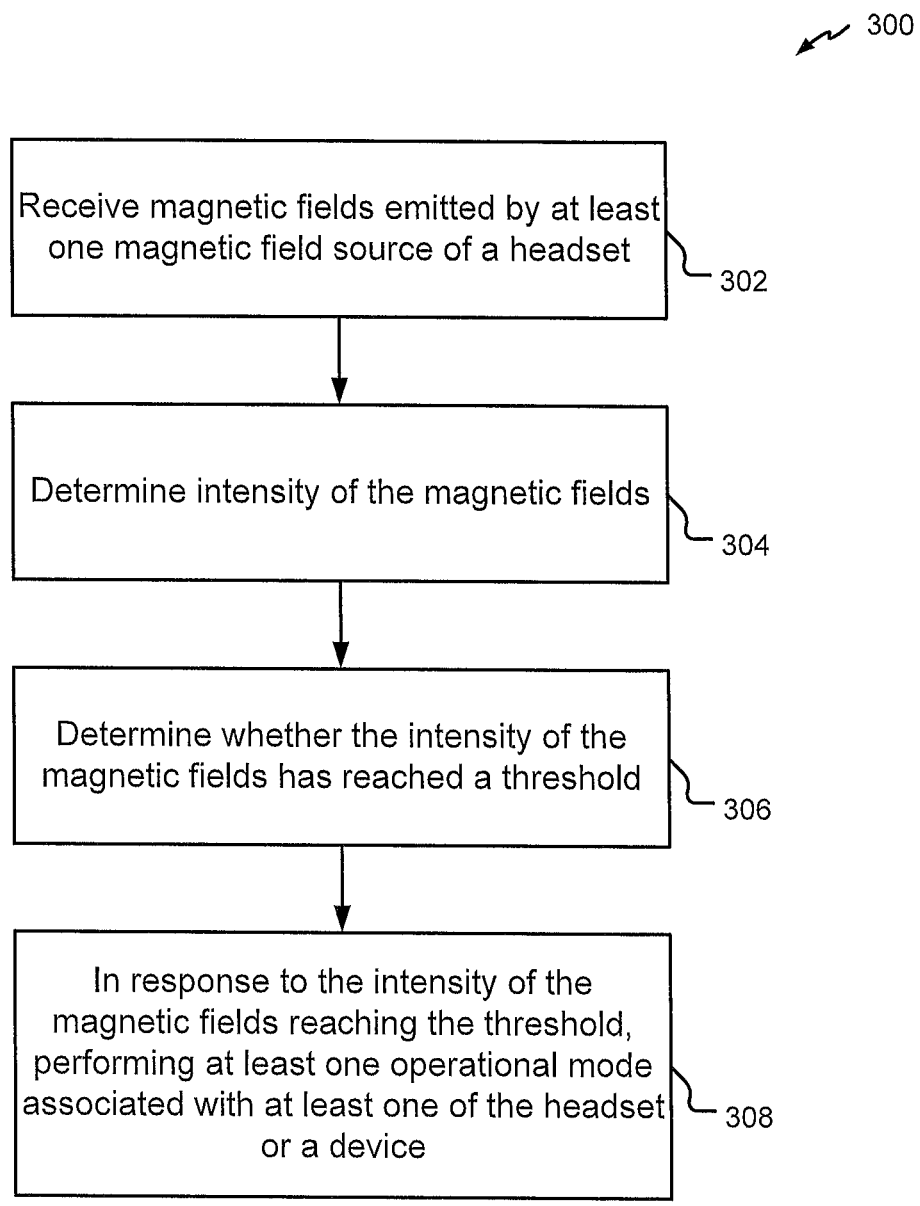
FIG. 4 is a flowchart of an illustrative implementation of a method for an on/off head detection system using magnetic field sensing.

FIG. 4 depicts a flowchart diagram representing an implementation of a method 300 for using magnetic field sensing to determine the configuration, position, and/or orientation of a headphone, including whether it is on or off a user's head. In one example, the method 300 is implemented in the headphone system 100 of FIG. 1 or the headphone system 400 of FIG. 3. In another example, the method 300 is implemented in the component device 200 of FIG. 2.

The method 300 includes, at 302, receiving magnetic fields emitted by at least one magnetic field source of a headphone. The magnetic field source may be a magnet and/or coil associated with at least one acoustic transducer of the headphone, a magnet distinct from an acoustic transducer of the headphone, or a coil excited with electrical current, or a combination thereof. For instance, magnetic field sensor 104 and/or magnetic field sensor 112 of FIG. 1, magnetic field sensor 202 of FIG. 2, or NFC reader 434 and/or NFC reader 432 of FIG. 3 receives the emitted magnetic fields. The method 300 further includes determining an intensity of the magnetic fields, at 304. For example, the control module 106 of FIG. 1, the control module 204 of FIG. 2, or the control module 406 of FIG. 3 determines the intensity of the magnetic fields. The method 300 also includes, at 306, determining whether the intensity of the magnetic fields has reached a threshold. A determination of whether the intensity of the magnetic fields has reached a threshold may also be performed by the control module (e.g., control module 106 of FIG. 1, control module 204 of FIG. 2, or control module 406 of FIG. 3). In some examples (not illustrated in FIG. 4), as explained here, the method may include determining that the intensity of the magnetic fields has reached a threshold based on a trigger event.

At 308, in response to the intensity of the magnetic fields reaching the threshold, at least one operational mode associated with the headphone or a device in communication with the headphone is performed. For example, the control module 106 of FIG. 1, the control module 204 of FIG. 2, or the control module 406 of FIG. 3 performs the at least one operational mode.

In some examples (also not illustrated in FIG. 4), the method may include determining a time it takes the user to change the headphone from one position or orientation to another position or orientation. Such time information may be used by the control module to infer where the headphone has been placed. For example, moving the headphone from a carrying case to a head (or vice versa) may take more time than moving the headphone from a head to a neck (or vice versa). Thus, this information provides additional insight as to where the headphone has been placed (beyond whether it is on or off of the head). A determination of the time it takes the user to change the headphone from one position or orientation to another position or orientation may be performed by the control module (e.g., control module 106 of FIG. 1, control module 204 of FIG. 2, or control module 406 of FIG. 3).

In a particular illustrative example, a method includes receiving, in a first earpiece, a magnetic field emitted by a magnetic field source associated with a second earpiece of a headphone. For example, the magnetic field sensor 104 and/or magnetic field sensor 112 of FIG. 1, magnetic field sensor 202 of FIG. 2, or NFC reader 434 and/or NFC reader 432 of FIG. 3 may receive the emitted magnetic fields. The method further includes determining an intensity of the magnetic field. For example, the control module 106 of FIG. 1, the control module 204 of FIG. 2, or the control module 406 of FIG. 3 determines the intensity of the magnetic fields. The method further includes determining whether the intensity of the magnetic field satisfies a threshold. For example, the control module (e.g., control module 106 of FIG. 1, control module 204 of FIG. 2, or control module 406 of FIG. 3) may determine whether the intensity of the magnetic fields satisfies a threshold. The method further includes, in response to the intensity of the magnetic field satisfying the threshold, initiating an operation at the headphone or a device in communication with the headphone. For example, the control module 106 of FIG. 1, the control module 204 of FIG. 2, or the control module 406 of FIG. 3 may initiate an operation at the headphone system 100 as depicted in FIG. 1 or at a device coupled to the headphone system 100. Thus, the method may be used to initiate an operation at a device associated with a headphone system based on a detected magnetic field intensity. The detective magnetic field intensity may be indicative of whether a user is wearing the headphones of the head phone system. Accordingly, the method enables control of the device associated with the headphone system based on whether the user is wearing the headphones.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a DSP, a microcontroller, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed one or more processing devices at one site or distributed across multiple sites and interconnected by a network.

Actions associated with implementing all or part of the functions can be performed by one or more programmable processors or processing devices executing one or more computer programs to perform the functions of the processes described herein. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Those skilled in the art may make numerous uses and modifications of and departures from the specific apparatus and techniques disclosed herein without departing from the inventive concepts. For example, selected implementations of an on/off head detection system via magnetic field sensing in accordance with the present disclosure may include all, fewer, or different components than those described with reference to one or more of the preceding figures.

The disclosed implementations should be construed as embracing each and every novel feature and novel combination of features present in or possessed by the apparatus and techniques disclosed herein and limited only by the scope of the appended claims, and equivalents thereof.

The invention claimed is:

1. A method comprising:
receiving, in a first earpiece, a magnetic field emitted by a magnetic field source of an acoustic transducer of a second earpiece of a headphone, wherein the magnetic field source includes a magnet comprising part of a motor structure configured to generate sound and an additional magnet;
determining a change in an intensity of the magnetic field satisfies a threshold indicating a change in position of the headphone;
determining, based at least in part on information obtained from one or more other types of sensors associated with the headphone, the change in position of the headphone; and
in response to the change in position of the headphone determined by the change in the intensity of the magnetic field and the information obtained from the one or more other types of sensors, initiating an operation at the headphone or a device in communication with the headphone, wherein when it is determined that the headphone is on a user's head, a notification of an incoming phone call, message or other notification is provided to the user via an audible sound output by the first and second earpieces of the headphone, and when it is determined that the headphone is off the user's head, a notification of an incoming phone call, message or other notification is provided to the user via tactile sensation such as a vibration or an audible sound output by the first and second earpieces of the headphone with the sound being optimized for shared listening mode so the sound is more likely to be heard by the user.

2. The method of claim 1, wherein the operation includes a power-on operation, a power-off operation, disabling active noise reduction (ANR), enabling ANR, providing an audio output, pausing the audio output, providing a video output, pausing playback of the video output, or a combination thereof.

3. The method of claim 1, wherein initiating the operation includes processing an audio signal output by the headphone for one or more playback modes by changing at least one of a volume or equalization applied to the audio signal output by the headphone.

4. The method of claim 1, further comprising initiating a second operation at the headphone or the device in response to a determination that the intensity of the magnetic field has reached a second threshold.

5. The method of claim 1, wherein the magnetic field source comprises a near field communication (NFC) tag device.

6. The method of claim 1, further comprising determining a time for the headphone to change from a first headphone orientation to a second headphone orientation.

7. The method of claim 1, wherein determining the intensity of the magnetic field comprises measuring the magnetic field along three axes.

8. A headphone comprising:
a magnetic field sensor configured to detect a magnetic field emitted by a magnet comprising part of a motor structure configured to generate sound within the headphone and by an additional magnet; and
a control module configured to:
determine a change in an intensity of the magnetic field satisfies a threshold indicating a change in position of the headphone;
determining based at least in part on information obtained from one or more other types of sensors associated with the headphone, the change in position of the headphone; and
in response to the change in position of the headphone determined by the change in the intensity of the magnetic field and the information obtained from the one or more other types of sensors, perform an operational mode-associated with at least one of the headphone or a device in communication with the headphone, wherein when it is determined that the headphone is on a user's head, a notification of an incoming phone call, message or other notification is provided to the user via an audible sound output the headphone, and when it is determined that the headphone is off the user's head, a notification of an incoming phone call, message or other notification is provided to the user via tactile sensation such as a vibration or an audible sound output by the headphone with the sound being optimized for shared listening mode so the sound is more likely to be heard by the user.

9. The headphone of claim 8, wherein the control module is further configured to send a signal to the device that corresponds to the operational mode, and wherein the operational mode comprises powering-on the headphone or the device.

10. The headphone of claim 8, wherein the operational mode associated with the headphone or the device comprises changing at least one of a volume and equalization applied to the audio played by the headphone.

11. The headphone of claim 8, wherein the device comprises at least one of a smartphone, a computer, a computer tablet, a first system capable of outputting video, a second system capable of outputting audio, a radio, a television, or a cellular phone.

12. The headphone of claim 8, wherein the control module is further configured to perform a second operational mode in response to a determination that the intensity of the magnetic field has reached a second threshold.

13. The headphone of claim 8, wherein the magnetic field emanates from one or more of a magnet associated with an acoustic transducer of the headphone or a magnet distinct from the acoustic transducer.

14. The headphone of claim 8, wherein the magnetic field emanates from a near field communication (NFC) tag device.

15. The headphone of claim 8, wherein the magnetic field sensor is configured to detect the magnetic field along three axes.

16. The headphone of claim 8, wherein the magnetic field sensor is configured to detect the magnetic field at a periodic interval, and the periodic interval depends on an operating state of the headphone.

17. A headphone system comprising:
   a first acoustic transducer;
   a second acoustic transducer;
   a magnetic field sensor configured to detect a magnetic field emitted by a magnet comprising part of a motor structure configured to generate sound within the first acoustic transducer or the second acoustic transducer and by an additional magnet;
   a control module configured to:
      determine a change in an intensity of the magnetic field satisfies a threshold indicating a change in position of the headphone;
      determining, based at least in part on information obtained from one or more other types of sensors associated with the headphone, the change in position of the headphone; and
      in response to the change in position of the headphone determined by the change in the intensity of the magnetic field and the information obtained from the one or more other types of sensors, perform an operational mode associated with at least one of the headphone or a device in communication with the headphone, wherein when it is determined that the headphone is on a user's head, a notification of an incoming phone call, message or other notification is provided to the user via an audible sound output by the first and second earpieces of the headphone, and when it is determined that the headphone is off the user's head, a notification of an incoming phone call, message or other notification is provided to the user via tactile sensation such as a vibration or an audible sound output by the first and second earpieces of the headphone with the sound being optimized for shared listening mode so the sound is more likely to be heard by the user.

18. The headphone system of claim 17, wherein the device comprises at least one of a smartphone, a computer, a computer tablet, a first system capable of outputting video, a second system capable of outputting audio, a radio, a television, or a cellular phone.

19. The headphone system of claim 17, wherein the control module is further configured to determine a time for the headphone to change from a first headphone orientation to a second headphone orientation.

20. The headphone system of claim 17, wherein the magnetic field sensor is configured to detect the magnetic field along three axes.

21. The headphone system of claim 17, wherein the control module is further configured to perform a second operational mode associated with the headphone or the device in response to the intensity of the magnetic field reaching a second threshold.

22. The headphone system of claim 21, wherein the control module is further configured to determine whether the intensity of the magnetic field has reached a third threshold, and in response to the intensity of the magnetic field reaching the third threshold, to perform a third operational mode associated with the headphone or the device.

\* \* \* \* \*